United States Patent [19]
Henry et al.

[11] Patent Number: 6,014,743
[45] Date of Patent: Jan. 11, 2000

[54] APPARATUS AND METHOD FOR RECORDING A FLOATING POINT ERROR POINTER IN ZERO CYCLES

[75] Inventors: G. Glenn Henry; Terry Parks, both of Austin, Tex.

[73] Assignee: Intergrated Device Technology, Inc., Santa Clara, Calif.

[21] Appl. No.: 09/019,452

[22] Filed: Feb. 5, 1998

[51] Int. Cl.[7] ................................................. G06F 9/302
[52] U.S. Cl. ........................................... 712/244; 712/222
[58] Field of Search ..................................... 712/222, 244

[56] References Cited

U.S. PATENT DOCUMENTS

| | | | |
|---|---|---|---|
| 5,375,212 | 12/1994 | Saini ........................................ | 712/244 |
| 5,559,977 | 9/1996 | Avnon et al. ........................... | 712/244 |
| 5,649,225 | 7/1997 | White et al. ............................. | 712/23 |
| 5,721,857 | 2/1998 | Glenn et al. ............................. | 712/23 |
| 5,784,607 | 7/1998 | Henry et al. ............................ | 712/245 |
| 5,805,918 | 9/1998 | Blomgren et al. ...................... | 712/43 |
| 5,835,748 | 11/1998 | Orenstein et al. ...................... | 712/217 |
| 5,887,175 | 3/1999 | Col et al. ................................. | 710/260 |

*Primary Examiner*—William M. Treat
*Attorney, Agent, or Firm*—Richard K. Huffman; James W. Huffman

[57] ABSTRACT

An apparatus and method for recording a floating point macro instruction error pointer within a microprocessor is provided. The apparatus includes translation/control logic for generating a micro instruction sequence to perform a floating point operation. The micro instruction sequence includes a first micro instruction, inserted in the sequence in place of a translate slip, which directs the microprocessor to store a first part of the floating point macro instruction error pointer associated with a floating point macro instruction. The micro instruction sequence also includes a micro instruction extension, associated with a floating point micro instruction within the sequence. The extension directs the microprocessor to store a second part of the floating point macro instruction error pointer. The error pointer is stored in zero effective time increments without requiring additional hardware.

15 Claims, 5 Drawing Sheets

Fig. 3

| Cycle | Fetch | Translate | Register | Address |
|---|---|---|---|---|
| 1 | -- | -- | -- | -- |
| 2 | FMUL [EBX+8] | -- | -- | -- |
| 3 | -- | FMUL [EBX+8] | -- | -- |
| 4 | -- | -- | FMUL(1) | -- |
| 5 | -- | -- | slip | FMUL(1) |
| 6 | -- | -- | LD EBX,8 | slip |
| 7 | -- | -- | FMUL(3) | LD EBX,8 |
| 8 | -- | -- | FPS OP | FMUL(3) |
| 9 | -- | -- | FPS CS | FPS OP |
| 10 | -- | -- | FPS IP | FPS CS |
| 11 | -- | -- | FPS DS | FPS IP |
| 12 | -- | -- | FPS DO | FPS DS |
| 13 | -- | -- | -- | FPS DO |
| 14 | -- | -- | -- | -- |

5 CYCLES

APPARATUS AND METHOD FOR RECORDING A FLOATING POINT ERROR POINTER IN ZERO CYCLES

This application is related to U.S. patent application Ser. No. 09/033,399, filed Mar. 2, 1998, entitled "APPARATUS AND METHOD FOR SINGLE INSTRUCTION RECORD FLOATING POINT".

BACKGROUND OF THE INVENTION

1. Field of the Invention

This invention relates in general to the field of floating point instruction execution in computers, and more specifically to an improved apparatus and method for recording exception pointer data associated with a floating point instruction.

2. Description of the Related Art

Software programs that execute on a microprocessor consist of macro instructions, which together direct the microprocessor to perform a function. Each macro instruction directs the microprocessor to perform a specific operation, which is part of the function, such as loading data from memory, storing data in a register, or adding the contents of two registers.

A macro instruction may prescribe a simple operation, like moving the contents of one register location to another register location. In contrast, a different macro instruction may prescribe a complex operation, such as adding a floating point number to another floating point number. Compared to the manipulation of integer data, the manipulation of floating point data by the microprocessor is complex and time consuming. Because of this, typical microprocessors employ a dedicated floating point unit to improve the speed and efficiency of floating point calculations.

Within an x86-compatible microprocessor, a floating point macro instruction is often decoded into a sequence of floating point micro instructions that direct the microprocessor to execute a floating point operation. The sequence of floating point micro instructions proceeds through the integer unit of the microprocessor and is passed to the floating point unit. The floating point unit executes the sequence of floating point micro instructions and provides a result of the floating point operation.

In many instances, however, the floating point unit cannot produce the result of the floating point operation. Consequently, the floating point unit generates an exception code to inform the integer unit. An exception handler, part of the software program, processes the exception code.

For the exception handler to process the exception code, the floating point macro instruction that caused the exception condition must be identified. In an x86-compatible microprocessor, the responsible floating point macro instruction is identified via a floating point macro instruction error pointer. The floating point macro instruction error pointer documents the operation specified by the floating point macro instruction, the memory location from where it was retrieved, and the memory location of any associated floating point data.

Each time a floating point macro instruction is decoded, and a sequence of floating point micro instructions is passed to the floating point unit, a floating point macro instruction error pointer is stored. If a floating point exception results, then the floating point macro instruction error pointer is thereby available for use by an exception handler.

Typical microprocessors employ one of two general techniques to store the floating point macro instruction error pointer: A first technique dedicates hardware for the purpose of retrieving and storing the floating point macro instruction error pointer. A second technique makes use of unique micro instructions to store specified error pointer elements in associated registers in the register set.

The first technique requires extra hardware above that required to implement the basic functions of the microprocessor. Along with this hardware comes the requirement for extra power. Dedicated hardware also adds complexity to the design. Both of these attributes result in a cost addition to the microprocessor. Because of these reasons, one skilled in the art holds that the dedicated hardware in a microprocessor is undesirable.

The second technique dedicates time to store elements of the error pointer. After a floating point macro instruction is decoded into a floating point micro instruction sequence, the microprocessor adds micro instructions to this sequence. The added micro instructions direct the microprocessor to store elements of the error pointer. Storage of the entire error pointer requires several cycles of the microprocessor clock. Typically, one clock cycle is required to store each error pointer element. Consequently, utilizing the second technique increases execution time for the floating point macro instruction over that required to perform the specified floating point operation. Therefore, one skilled in the art appreciates that the second technique exhibits another problem, because it causes an increase in execution time for a given floating point macro instruction.

Since floating point macro instructions are extensively used in software programs, the consequent time delays incurred to record the floating point error pointer, as described above, can negatively impact the time required to execute a program.

Therefore, what is needed is an apparatus and method hat allow a microprocessor to record a floating point macro instruction error pointer faster than has heretofore been provided. In addition, what is needed is a microprocessor that does not require dedicated hardware to record a floating point macro instruction error pointer.

SUMMARY

To address the above-detailed deficiencies, it is an object of the present invention to provide a microprocessor that records a floating point error pointer faster than has heretofore been provided.

Another object of the invention is to provide a microprocessor that does not require dedicated hardware to record a floating point macro instruction error pointer.

Accordingly, in the attainment of the aforementioned objects, it is a feature of the present invention to provide an apparatus for recording a floating point macro instruction error pointer in a microprocessor. The apparatus includes translation control logic, which receives a floating point macro instruction and generates a micro instruction sequence to perform a specified floating point operation. The micro instruction sequence includes a first micro instruction, which is inserted into a translate slip in the sequence. The first micro instruction directs the microprocessor to store a first part of the floating point macro instruction error pointer. The micro instruction sequence also includes a micro instruction extension that is associated with a floating point micro instruction within the micro instruction sequence. The micro instruction extension directs the microprocessor to store a second part of the floating point macro instruction error pointer. The floating point macro instruction error pointer is recorded in zero effective time increments.

An advantage of the present invention is that the effective time associated with execution of a floating point macro instruction is entirely eliminated.

In another aspect, it is a feature of the present invention to provide a microprocessor for recording a floating point error pointer having selectors. The microprocessor includes translation/control logic that receives a floating point macro instruction and generates a micro instruction sequence. The micro instruction sequence directs the microprocessor to execute an operation specified by the floating point macro instruction. The translation/control logic also generates a record selectors micro instruction, which directs the microprocessor to store the selectors associated with the floating point macro instruction. The record selectors micro instruction is inserted in place of a translate slip in the micro instruction sequence.

In yet another aspect, it is a feature of the present invention to provide a microprocessor for recording a floating point macro instruction error pointer. The microprocessor includes translation/control logic, coupled to a macro instruction buffer, for generating a record selectors micro instruction. The record selectors micro instruction directs the microprocessor to store selectors associated with a floating point macro instruction. The microprocessor also includes register/control logic, coupled to the translation/control logic, for providing and storing the selectors, an instruction pointer, and a macro opcode. The microprocessor additionally has address/control logic, coupled to the register/control logic, for providing and storing a data offset. The selectors, the instruction pointer, the macro opcode, and the data offset define the floating point macro instruction error pointer.

Yet another advantage of the present invention is that the microprocessor uses common hardware to record the error pointer, resulting in decreased power requirements, design complexity, and commensurate costs.

In a further aspect, it is a feature of the present invention to provide a microprocessor for saving a floating point unit environment. The microprocessor includes translation/control logic, for generating a micro instruction sequence that directs the microprocessor to execute an operation prescribed by a floating point macro instruction. The micro instruction sequence includes a record selectors micro instruction, which directs the microprocessor to save selectors associated with the floating point macro instruction. The micro instruction sequence also includes a record opcode/offset micro instruction extension, which directs the microprocessor to store opcode/offset data associated with the floating point macro instruction. The microprocessor also includes register/control logic, coupled to the translation/control logic, for storing the selectors, an opcode, and an instruction pointer. The floating point unit environment provides data required by an exception handler, when a floating point unit exception occurs, to determine that the floating point unit exception occurred as a result of executing the floating point macro instruction.

Moreover, it is a feature of the present invention to provide a method for saving a floating point macro instruction exception pointer in a microprocessor. The method includes generating a floating point micro instruction sequence to execute an operation specified by a floating point macro instruction. The method also includes producing a record selectors micro instruction, which directs the microprocessor to save selectors associated with the floating point macro instruction. The method additionally includes providing a record opcode/offset micro instruction extension to a micro instruction in the floating point micro instruction sequence, which directs the microprocessor to save opcode/offset data associated with the floating point macro instruction. The method further includes saving the floating point macro instruction exception pointer.

Yet a further advantage of the present invention is that execution time for software programs comprising a significant number of floating point macro instructions is favorably decreased.

BRIEF DESCRIPTION OF THE DRAWINGS

These and other objects, features, and advantages of the present invention will become better understood with regard to the following description, and accompanying drawings where:

FIG. 3 is a table illustrating recording of data that identifies a floating point instruction by the microprocessor of FIG. 2.

DETAILED DESCRIPTION

Figure 1:
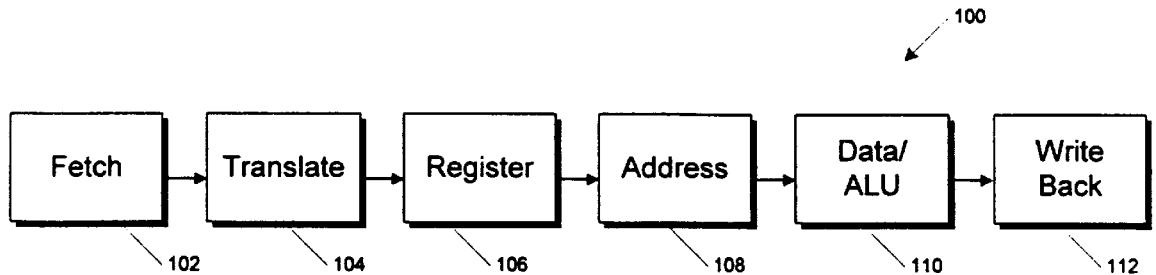
FIG. 1 is a block diagram of a related art pipeline microprocessor.

Referring to FIG. 1, a six-stage related art pipeline microprocessor 100 is shown. The microprocessor 100 includes six stages: fetch 102, translate 104, register 106, address 108, data/ALU 110 and write back 112. The fetch stage 102 fetches macro instructions that are to be executed by the microprocessor 100. The translate stage 104 translates or decodes the fetched macro instructions into a sequence of micro instructions that may be executed by the microprocessor 100. The register stage 106 retrieves operands specified by the micro instructions from a register file, for use by later stages in the pipeline. The address stage 108 calculates memory addresses specified by micro instructions, which are to be used in data access operations (i.e., data retrieval and storage operations). The data/ALU stage 110 either performs arithmetic logic unit (ALU) operations on data retrieved from the register file, or reads/writes data from/to memory using the memory addresses calculated in the address stage 108. The write back stage 112 writes the result of a data read operation, or an ALU operation, to the register file, or to a memory location.

In operation, macro instructions are fetched by the fetch stage 102, are translated into micro instructions by the translate stage 104, and proceed through stages 106–112 for execution.

During a cycle of the pipeline, while any given stage in the pipeline is executing a micro instruction, the previous stage should be executing the next micro instruction. If a micro instruction within one stage requires more than one cycle to completely execute, then subsequent instructions are stalled until execution of that micro instruction is completed. When this occurs, pipeline slips are inserted into the pipeline to insure that the subsequent micro instructions do not prematurely advance in the pipeline.

A macro instruction may prescribe a simple operation, such as moving the contents of one register location within the register stage 106 to another register location. In contrast, another macro instruction may prescribe a complex operation, such as adding a floating point number to another floating point number.

A floating point number is an approximation to a real number, encoded in a binary format, that is recognizable and capable of being manipulated by the microprocessor 100. Compared to manipulation of integer data, manipulation of floating point data by the microprocessor 100 is complex and time consuming. Because of this, typical microprocessors employ dedicated floating point hardware (i.e., logic, circuitry) to improve the speed and efficiency of floating point calculations.

The dedicated floating point hardware is commonly referred to as a floating point chip, a floating point unit, a floating point element, or a numeric coprocessor, etc. Known by any number of labels, one skilled in the art will readily observe that the function is the same—to execute floating point operations. Hereinafter, this dedicated floating point hardware is referred to as a floating point unit. The remaining microprocessor hardware is referred to as an integer unit. The dedicated floating point unit may be part of the same mechanical package as the remainder of the microprocessor or it may reside in a separate mechanical package.

Figure 2:
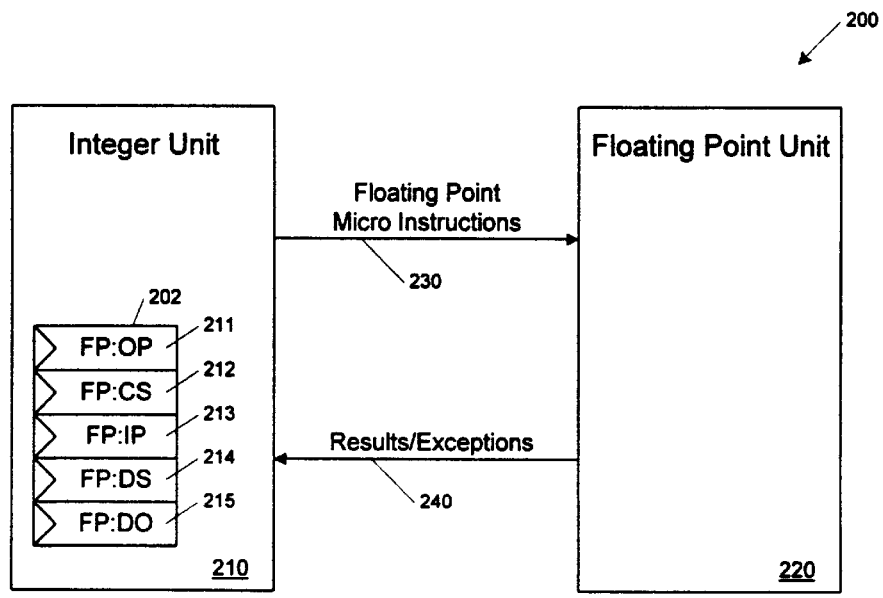
FIG. 2 is a block diagram of an integer unit and a floating point unit within a microprocessor.

Now referring to FIG. 2, a pipeline microprocessor 200 comprising an integer unit 210 and a floating point unit 220 is illustrated. The floating point unit 220 consists of specific hardware to execute floating point operations. The integer unit 210 includes a register set 202. This register set 202 is used to store data, described in detail below, associated with a floating point macro instruction.

In operation, a floating point macro instruction is fetched and translated by the integer unit 210 into a sequence of floating point micro instructions that direct the microprocessor to execute a floating point operation. The floating point macro instruction may prescribe a memory location that contains data for use in the floating point operation. If so, then the sequence of floating point micro instructions prescribes address components, which are used to determine an address of the memory location. Some of the address components may be retrieved from a register file (not shown) in the integer unit 210. After the sequence of floating point micro instructions proceeds through the integer unit 210, it passes to the floating point unit 220. The floating point unit 220 executes the sequence of floating point micro instructions and produces a result of the floating point operation.

The floating point unit 220 cannot always provide a result of the floating point operation. For instance, the sum of two very large real numbers may be a real number that cannot be represented in a result register (not shown) because the number of bits required to represent the sum exceeds the size of the result register. This specific example is a condition known as an "overflow." Consequently, the floating point unit 220 generates an exception code to inform the integer unit 210 that the data in the result register does not represent a true floating point result.

FIG. 2 shows communication that occurs between the integer unit 210 and the floating point unit 220. Floating point micro instructions pass from the integer unit 210 to the floating point unit 220 via bus 230. Results and/or exception conditions pass from the floating point unit 220 to the integer unit 210 via bus 240. When the contents of the result register in the floating point unit 220 do not represent a true floating point result, the floating point unit 220 generates an exception code, which is sent via bus 240 to inform the integer unit 210. Many other conditions related to floating point operations may also cause generation of an exception code, such as underflow and divide-by-zero. The set of conditions resulting in the generation of an exception code by the floating point unit 220 are called floating point exceptions.

A designated portion of a software program that deals with a floating point exception is called an exception handler. An exception handler may be so elementary in function as to simply ignore the floating point exception indicated by the exception code. Conversely, the exception handler may be so complex that it corrects the condition which initially caused the exception.

For the exception handler to perform its intended function though, the floating point macro instruction that caused the exception condition must be determined. A particular floating point macro instruction is typically identified by referring to a location in memory from where it was fetched, a floating point operation which it specifies, and a location in memory of associated floating point data (if any). Known microprocessors identify the location in memory of the floating point macro instruction by referring to an execution pointer, the specified floating point operation is identified by a macro opcode, and the location of associated data is identified by a data pointer. The execution pointer is also commonly referred to as an instruction pointer. The macro opcode is sometimes simply referred to as an opcode. The macro opcode is a field of the floating point macro instruction that specifies the floating point operation. Collectively, the execution pointer, macro opcode, and the data pointer are commonly known as a floating point macro instruction error pointer or a floating point macro instruction exception pointer. More simply, it is called an error pointer or an exception pointer.

Each time a sequence of floating point micro instructions is passed to the floating point unit 220, the associated floating point macro instruction error pointer is stored in the set of registers 202. If an exception is generated, then the floating point macro instruction error pointer is thereby available for use by an exception handler. The register set 202 includes a floating point opcode register 211, a floating point code segment selector register 212, a floating point instruction pointer register 213, a data segment selector register 214, and a data offset register 215. A floating point macro opcode is stored in the floating point opcode register 211. A code segment selector and an instruction pointer, both elements of the execution pointer, are stored in the floating point code segment selector register 212 and the floating point instruction pointer register 213, respectively. A data segment selector and a data offset, both elements of the data pointer (if any), are stored in the floating point data segment selector register 214 and the floating point data offset register 215, respectively. The code segment selector and data segment selector are referred to as selectors.

Known microprocessors use one of two techniques to store the floating point macro instruction error pointer: A first technique dedicates hardware for the purpose of retrieving and storing the floating point macro instruction error pointer. A second technique has a unique set of micro instructions to store specified error pointer elements in associated registers in the register set.

The first technique requires extra hardware dedicated to recording the floating point macro instruction error pointer. This extra hardware consumes extra power, adds complexity to the design, and adds cost to the microprocessor. Because of these reasons, the addition of dedicated hardware in a microprocessor is generally viewed by those skilled in the art as undesirable.

The second technique utilizes micro instructions specifically designed to store elements of the error pointer. The micro instructions are inserted at the end of a floating point micro instruction sequence, but require several cycles of the pipeline clock to record the floating point macro instruction error pointer, typically one clock cycle for each error pointer element to be stored. Each additional cycle of the pipeline clock required to record a floating point error pointer for a given macro instruction results in a commensurate increase in the time required to execute the given macro instruction. Hence, one skilled in the art will appreciate that the second technique for recording a floating point macro instruction error pointer is also a problem, because it increases the execution time for a given floating point macro instruction.

With the above background on the execution of a floating point macro instruction and storage of its corresponding error pointer, a problem associated with storage of the error pointer will now be discussed with reference to FIG. 3.

In FIG. 3, a table 300 is provided, illustrating recording of a floating point macro instruction error pointer by the pipeline microprocessor of FIG. 2. The floating point macro instruction error pointer identifies a corresponding floating point macro instruction. The corresponding floating point macro instruction is designated FMUL [EBX+8]. More specifically, FMUL specifies a floating point multiply operation to be performed by the microprocessor 200, and EBX designates a register in the register file (not shown). The contents of register EBX are a base address for a memory location containing floating point data associated with the specified floating point operation. A displacement for the memory location is designated by 8. A sum of the base address and the displacement is known as a data offset for the memory location. The marks—designate instructions before or after the instructions of interest. Progression of the floating point macro instruction through noted stages of the pipeline is shown with respect to cycles of a pipeline clock.

The particular operation specified by the floating point macro instruction in FIG. 3 is not pertinent to this discussion, except to the extent that it has an associated floating point macro instruction error pointer that needs to be saved in the register set 202. FIG. 3 shows a generic multiply instruction, FMUL [EBX+8], which is translated into a sequence of three micro instructions to perform the specified operation. The three micro instructions are in the Register column of table 300. They are designated FMUL(1), OLD EBX,8, and FMUL(3). For brevity, this problem is illustrated using three associated micro instructions, however, the illustration applies to micro instruction sequences of any length. In FIG. 3, the floating point macro instruction error pointer is saved by executing five floating point store (FPS) micro instructions, which appear at the end of the micro instruction sequence in the Register column.

During cycle 2, the floating point macro instruction is fetched from memory and provided to a translate stage (not shown) of the microprocessor 200.

During cycle 3, the floating point macro instruction, FMUL [EBX+8], proceeds through the translate stage of the microprocessor 200. Therein, it is translated into a corresponding sequence of micro instructions that directs the microprocessor 200 to execute the operation specified by the floating point macro instruction. Some micro instructions in the sequence may specifically direct subsequent stages in the pipeline to perform an operation, such as retrieving data from a location in the register file. Other micro instructions in the sequence may specifically direct the floating point unit 220 to perform an operation. Also during cycle 3, the next macro instruction is fetched by the fetch stage of the microprocessor 200. Progression of the next macro instruction follows one cycle behind the floating point macro instruction.

Translation can be accomplished by a number of means, such as a sequential logic translator, a look up table in a control read-only memory (ROM), or a combination of both of the aforementioned means. Typically, a combination of means is employed such that a first micro instruction in a sequence is produced by the translator and the remaining micro instructions in the sequence are fetched from the control ROM. Frequently, there is also an initial access delay associated with the control ROM so that slips must be inserted into the pipeline until the remaining micro instructions are provided by the control ROM. This example is illustrated in FIG. 3. In the Register column, a slip is inserted between micro instruction FMUL(1) and micro instruction LD EBX,8 to account for an access delay associated with a control ROM.

During cycle 4, a first micro instruction in the corresponding sequence of micro instructions proceeds through the register stage of the microprocessor 200. It is designated by FMUL(1). Therein, if specified by the first micro instruction, data is retrieved from the register file.

During cycle 5, the first micro instruction in the corresponding sequence proceeds through the address stage of the microprocessor 200. At this point, the first micro instruction is passed from the integer unit 210 to the floating point unit 220. Also during cycle 5, a slip is inserted into the pipeline to illustrate the access delay associated with a control ROM. This kind of slip is called a translate slip.

During cycle 6, the translate slip proceeds through the address stage of the microprocessor 200. At this point, the translate slip is promulgated from the integer unit 210 to the floating point unit 220. Also during cycle 6, a second micro instruction in the corresponding sequence of micro instructions proceeds through the register stage of the microprocessor 200. It is designated by LD EBX,8. In general, if a floating point macro instruction prescribes data from memory to be used in a floating point operation, then one of the micro instructions in the corresponding micro instruction sequence directs the microprocessor 200 to load the data using address components prescribed by the floating point macro instruction. This is illustrated in FIG. 3 by the LD EBX,8 micro instruction. As described above, the base address for the data location is stored in register EBX and 8 is provided as the displacement. The micro opcode, LD, also implicitly prescribes a data segment, which is used along with the base address and the displacement to determine a linear address in memory containing the data.

A particular memory location is identified by prescribing a data segment, a base address within the data segment, and a displacement. The data segment refers to a data segment selector register (not shown) in the register stage. Contents of the data segment selector register are called a data segment selector, which specify a data segment base address for the memory location. A linear address of the memory location is generated by summing the data segment base address, the base address, and the displacement. Also, a sum of the base address and the displacement is called a data offset, or simply, an offset. Hence, during cycle 6, in the register stage, the base address of a memory location containing floating point data is retrieved from register EBX. The base address is provided, along with the displacement and a data segment base address, to the next stage in the pipeline.

During cycle 7, the second micro instruction in the corresponding sequence proceeds through the address stage of the microprocessor 200. Therein, as described above, a linear address for the memory location is calculated. At this point, the second micro instruction is passed from the integer unit 210 to the floating point unit 220. Also during cycle 7, a third micro instruction in the corresponding sequence, FMUL(3), proceeds through the register stage.

During cycle 8, the third micro instruction proceeds through the address stage and is passed to the floating point unit 220. At this point, all of the micro instructions in the sequence that are directly related to executing the specified floating point operation have been passed to the floating point unit 220. Also during cycle 8, a first floating point store micro instruction proceeds through the register stage. It is designated FPS OP. More specifically, FPS directs the microprocessor to execute a floating point store operation and OP designates that an opcode for the floating point macro instruction be stored in the floating point macro opcode register 211. During this the cycle, the macro opcode for the floating point macro instruction is stored in the floating point macro opcode register 211.

During cycle 9, the first floating point store micro instruction proceeds through the address stage. Also during cycle 9, a second floating point store micro instruction proceeds through the register stage. It is designated FPS CS. More specifically, CS designates that a code segment selector for the floating point macro instruction, which is an element of the execution pointer, be stored in the floating point code segment selector register 212. During this cycle, the code segment selector is retrieved from the register file and is stored in the floating point code segment selector register 212.

During cycle 10, the second floating point store micro instruction proceeds through the address stage. Also during cycle 10, a third floating point store micro instruction proceeds through the register stage. It is designated FPS IP. More specifically, IP designates that the contents of the instruction pointer register (not shown) associated with the floating point macro instruction, which is also an element of the execution pointer, be stored in the floating point instruction pointer register 213. During this cycle, the contents of the instruction pointer register is stored in the floating point instruction pointer register 213.

During cycle 11, the third floating point store micro instruction proceeds through the address stage. Also during cycle 11, a fourth floating point store micro instruction proceeds through the register stage. It is designated FPS DS. More specifically, DS designates the data segment selector for the floating point macro instruction. The data segment selector, which is an element of the data pointer, is to be stored in the floating point data segment selector register 214. During this cycle, the data segment selector for the floating point macro instruction is retrieved from the register file and is stored in the floating point data segment selector register 214.

During cycle 12, the fourth floating point store micro instruction proceeds through the address stage. Also during cycle 12, a fifth floating point store micro instruction proceeds through the register stage. It is designated FPS DO. More specifically, DO designates that the data offset for the data associated with the floating point macro instruction, which is also an element of the data pointer, be stored in the floating point data offset register 215. The data offset, however, is not directly available from the register file. It is a value that must be calculated in the address stage, using data retrieved from the register file. Hence, during this cycle, the base address of the memory location is retrieved from register EBX in the register file. The base address, along with the displacement, is provided to the address stage.

During cycle 13, the fifth floating point store micro instruction proceeds through the address stage. Therein, the data offset is calculated by summing the base address and the displacement. Following calculation of the data offset, it is then stored in the floating point data offset register 215. At this point, storage of the floating point macro instruction error pointer is complete.

As is shown in FIG. 3, five cycles of the pipeline clock are required to record the floating point macro instruction error pointer. As was stated earlier, these additional cycles of the pipeline clock add time to that required for execution of the specified floating point operation. Therefore, one skilled in the art will conclude that typical program execution time is adversely impacted each time a floating point macro instruction is executed. This is because the pipeline cycles required to record the floating point macro instruction error pointer add execution time above and beyond that required to perform the specified floating point operation. The problem of additional pipeline cycles required to record the floating point macro instruction error pointer is addressed by the present invention, as is now described below.

Figure 4:
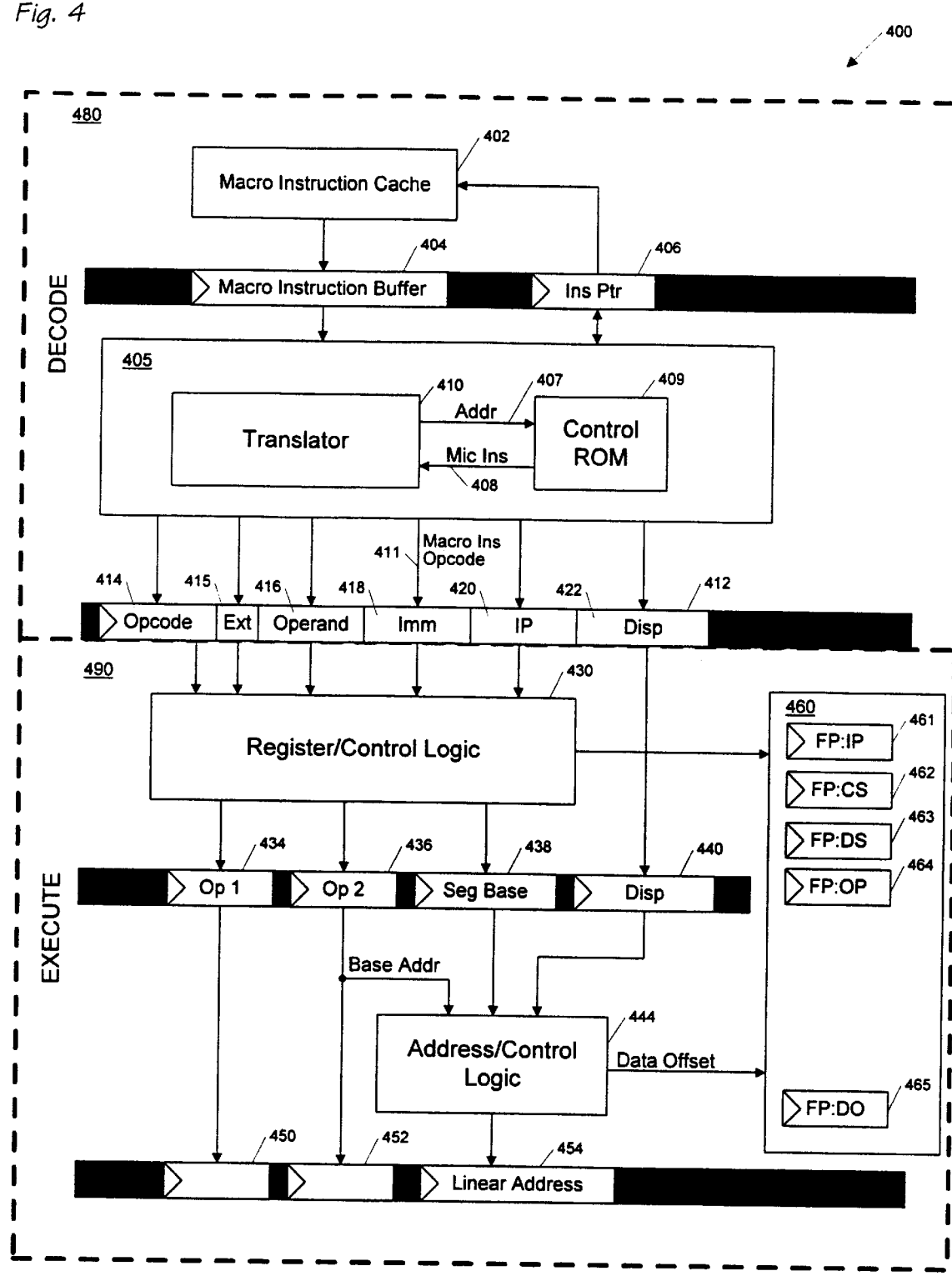
FIG. 4 is a block diagram of decode and execute stages of a pipeline microprocessor incorporating an embodiment of the present invention.

Now referring to FIG. 4, a portion of a pipeline microprocessor 400, incorporating an embodiment of the present invention, is provided. The portion includes a decode stage 480 and an execute stage 490. The decode stage 480 has a macro instruction cache 402 connected to a macro instruction buffer 434. In addition, the decode stage has translation/control logic 405. The translation/control logic 405 provides an output to the execute stage 490 via a micro instruction register 412. The translation/control logic 405 includes a translator 410 and a control ROM 409. The execute stage has register/control logic 430 that provides outputs to a first operand register 434, a second operand register 436, and a segment base address register 438. The execute stage also has address/control logic 444 connected to the second operand register 436, the segment base address register 438, and a displacement register 440. One output of the address/control logic 444 is provided to a linear address register 454. Both the register/control logic 430 and the address/control logic 444 provide outputs to a floating point macro instruction error pointer register set 460. The floating point macro instruction error pointer register set 460 includes a floating point instruction pointer register 461, a floating point code segment selector register 462, a floating point data segment selector register 463, a floating point macro opcode register 464, and a floating point data offset register 465.

Operationally, a macro instruction is retrieved from the macro instruction cache 402 and placed in the macro instruction buffer 404. The translation/control logic 405 retrieves the macro instruction from the macro instruction buffer 404 and translates it into a sequence of micro instructions for execution by following stages of the pipeline. Each micro instruction in the sequence is sequentially provided to the micro instruction register 412. The translation/control logic 405 also provides data used to calculate the address of a memory location containing a next macro instruction to be fetched from the macro instruction cache 402. This data is provided to the instruction pointer register 406. The location in memory of a given macro instruction is specified by the sum of two address components: a code segment base address and an instruction pointer. The code segment base address is stored in a code segment register (not shown) in the register/control logic 430. The instruction pointer is stored in the instruction pointer register 406. The code segment base address is specified by a code segment selector, which is the contents of a code segment selector register (not shown) in the register/control logic 430. Hence, the execution pointer for the given macro instruction is identified by referring to its associated code segment selector and instruction pointer.

Translation of the micro instruction into the sequence of micro instructions is performed by both the translator 410 and the control ROM 409. Typically, the translator 410 provides a first part of the micro instruction sequence. The translator provides an address via bus 407 that references a location in the control ROM 409 containing a second part of the micro instruction sequence. The second part includes the remaining micro instructions in the micro instruction sequence. The remaining micro instructions are provided by the control ROM 409 via bus 408. Because of an initial access delay associated with the control ROM 409, the translation/control logic 405 inserts a translate slip after the first part of the micro instruction sequence.

Each macro instruction has a macro opcode, which directs the microprocessor 400 to perform a specific operation. Each macro instruction may also contain operands. The operands either specify data to be used in the specific macro operation or prescribe address components used to calculate the memory location of data.

The micro instruction register 412 comprises a micro opcode field 414, an extension field 415, an operand field 416, an immediate data field 418, an instruction pointer field 420, and a displacement field 422. For a given micro instruction in the micro instruction register 412, the micro opcode field 414 contains a micro opcode, which directs the microprocessor 400 to perform a specific micro operation. The extension field 415 may contain an opcode extension, which directs the microprocessor 400 to perform an additional micro operation. Contents of the operand field 416 may specify register locations in the register/control logic 430 that contain either data to be used in the specific micro operation or address components used to calculate the memory location of associated data. The immediate field 418 normally contains integer data, provided directly by a macro instruction from which the given micro instruction was translated, which is used in the specific micro operation. The instruction pointer field 420 contains an instruction pointer for the macro instruction. The displacement field 422 contains a displacement, provided by the macro instruction, which is used by the address/control logic 444 to calculate a linear address of a memory location containing data. The displacement is also used by the address/control logic 444 to calculate a data offset.

The given micro instruction is provided to the register/control logic 430 via t he micro instruction register 412. If the given micro instruction specifies that contents of register locations in a register file (not shown) be used as data in the micro operation, then the register/control logic 430 provides the contents in the first and second operand registers 434, 436. If, however, the given micro instruction specifies register locations that contain address components for a memory location containing data to be used in the specific micro operation, then the register/control logic 430 provides a data segment base address in the segment base address register 438, and a base address in the second operand register 436. The displacement is placed in the displacement register 440. Like the code segment base address described earlier, the data segment base address is specified by a data segment selector, which is stored in a data segment selector register (not shown) in the register file. The data segment selector is specified in the given micro instruction. The register/control logic 430 uses the data segment selector to locate a register containing the data segment base address. From this register, the data segment base address is retrieved and provided to the segment base address register 438.

If the first and second operand registers 434, 436 contain data to be used in the micro operation, then their contents are provided to registers 450, 452 for use by later stages of the pipeline. Otherwise, the address/control logic 444 calculates and latches a data offset for a memory location containing data associated with the given micro instruction. The address/control logic 444 sums the displacement and the base address to form the data offset. The address/control logic 444 also calculates a linear address for the memory location by summing the segment base address and the data offset. The linear address is provided to the linear address register 454 for use by later stages in the pipeline.

The present invention translates a floating point macro instruction into a sequence of micro instructions that directs the microprocessor 400 to execute a floating point operation. In addition, the sequence includes a record selectors micro instruction, which directs the microprocessor 400 to store selectors associated with the floating point macro instruction. The selectors are a code segment selector and a data segment selector (if any) associated with the floating point macro instruction. Furthermore, a record opcode/offset micro instruction extension is generated, which directs the microprocessor 400 to store a macro opcode, instruction pointer, and data offset (if any) associated with the floating point macro instruction.

When a record selectors micro instruction is produced and placed in the micro instruction buffer 412, the micro opcode field 414 contains a micro opcode directing the microprocessor 400 to store selector elements of the floating point macro instruction error pointer in the floating point error pointer register set 460. The selectors are prescribed in the operand field 416 so that they can be provided by the register/control logic 430. The code segment selector for the floating point macro instruction is stored in the floating point code segment selector register 462 and the data segment selector (if any) for the floating point macro instruction is stored in the floating point data segment selector register 463.

The record opcode/offset micro instruction extension is generated and placed in the extension field 415 of a micro instruction within the sequence of micro instructions. Thus, the instruction pointer for the floating point macro instruction is stored in the floating point instruction register 461, the macro opcode for the floating point macro instruction is stored in the floating point macro opcode register 464, and the data offset (if any) for the floating point macro instruction is stored in the floating point data offset register 465.

When the record opcode/offset micro instruction extension is generated and placed in the extension field 415 of the micro instruction within the sequence of micro instructions, the macro opcode for the floating point macro instruction is also placed in the immediate field 418. The instruction pointer field 420 contains the instruction pointer.

When the record selectors micro instruction is executed, the register/control logic 430 provides the code segment selector from the register file and stores it in the floating point code segment selector register 462. The register/ control logic 430 also provides the data segment selector (if any) from the register file and stores it in the floating point data segment selector register 463.

When the record opcode/offset micro instruction extension is being executed, the register/control logic 480 stores the instruction pointer in the floating point instruction pointer register 461 and the macro opcode in the floating point macro opcode register 464. The only element of the error pointer left to be stored is the data offset (if any), which is calculated by the address/control logic 444.

When the address/control logic 444 executes the record opcode/offset micro instruction extension, it provides the data offset and stores it in the floating point data offset register 465. Note though, that the data offset is calculated and latched by the address/control logic 444 during execution of a load micro instruction in the sequence and not during execution of the record selectors micro instruction. The load micro instruction is part of the micro instruction sequence that executes the specified floating point operation. Its function is to load the floating point data from memory that is associated with the floating point operation. The latched data offset is provided by the address/control logic 444 during execution of the record selectors micro instruction. One embodiment that provides the data offset is described in copending U.S. patent application Ser. No. 09/008,927, filed Jan. 19, 1998, entitled "METHOD AND APPARATUS FOR IMPROVED ACCESSING OF AGGREGATE DATA", which is hereby incorporated by reference.

Because the record selectors micro instruction is a single micro instruction, the present invention inserts it into the sequence of micro instructions in place of a translate slip. The record opcode/offset micro instruction extension is placed in the extension field 415 of a micro instruction within the sequence of micro instructions. Therefore, in contrast to the five micro instructions required to record the floating point macro instruction error pointer, as shown in FIG. 3, use of the present invention eliminates the need for any additional pipeline cycles. The elimination of this need is more completely illustrated below with reference to FIG. 5.

Figure 5:
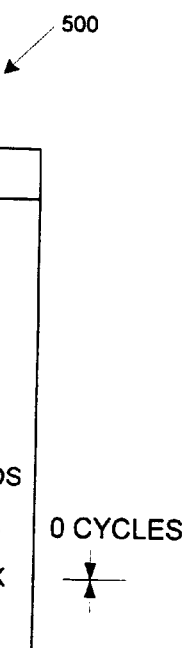
FIG. 5 is a table illustrating recording data that identifies a floating point instruction by the microprocessor of FIG. 4.

Referring to FIG. 5, a table 500 is provided, illustrating recording of a floating point macro instruction error pointer by the pipeline microprocessor of FIG. 4. The floating point macro instruction error pointer identifies a corresponding floating point macro instruction. The corresponding floating point macro instruction is designated FMUL [EBX+8]. More specifically, FMUL specifies a floating point multiply operation to be performed by the microprocessor 400, and EBX designates a register in the register/control logic 430. The contents of register EBX are a base address for a memory location containing floating point data associated with the specified floating point operation. A displacement for the memory location is designated by 8. A sum of the base address and the displacement a data offset for the memory location. The marks—designate instructions before or after the instructions of interest. Progression of the floating point macro instruction through noted stages of the pipeline is shown with respect to cycles of a pipeline clock.

The particular operation specified by the floating point macro instruction in FIG. 3 is not pertinent to this discussion, except to the extent that it has an associated floating point macro instruction error pointer that needs to be saved in the register set 460. FIG. 5 shows a generic multiply instruction, FMUL [EBX+8], which is translated into a sequence of three micro instructions to perform the specified operation. The three micro instructions are in the Register column of table 500. They are designated FMUL(l), LD EBX,8, and FMUL(3).X. As in the discussion pertaining to FIG. 3, this problem is illustrated using three associated micro instructions, however, the illustration applies to micro instruction sequences of any length. In FIG. 5, a first part of the floating point macro instruction error pointer is saved by executing a record selectors micro instruction, XRFP CS,DS, which appears in the Register column. A second part of the floating point macro instruction error pointer is saved by executing a record opcode/offset micro instruction extension, X, which is appended to the FMUL(3) micro instruction in the register column. The first part of the floating point macro instruction error pointer includes a code segment selector and a data segment selector (if any) associated with the floating point macro instruction. The second part includes a macro opcode, and instruction pointer, and a data offset (if any) associated with the floating point macro instruction.

During cycle 2, the floating point macro instruction is fetched from the macro instruction cache 402 and is provided to the translate/control logic 405 of the microprocessor 400.

During cycle 3, the floating point macro instruction proceeds through the translate/control logic 405 of the microprocessor 400. Therein, it is translated into a corresponding sequence of micro instructions that direct the microprocessor 400 to execute the operation specified by the floating point macro instruction. Some micro instructions in the sequence may specifically direct subsequent stages in the pipeline to perform an operation, such as retrieving data from a register location in the register/control logic 430; other micro instructions in the sequence may specifically direct a floating point unit (not shown) to perform an operation. Also during cycle 3, the next macro instruction is fetched from the macro instruction cache 402. Progression of the next macro instruction follows one cycle behind the floating point macro instruction.

Translation is be accomplished by a number of means, such as a sequential logic translator, a lookup table in a control read-only memory (ROM), or a combination of both of the aforementioned means. FIG. 5 illustrates a combination of the means such that a first micro instruction in a sequence is produced by the translator 410 and the remaining micro instructions in the sequence are fetched from the control ROM 409. Frequently, there is also an initial access delay associated with the control ROM 409 so that slips are inserted into the pipeline until the remaining micro instructions are provided by the control ROM 409. This example is illustrated in the Register column of FIG. 5. However, in place of a translate slip, the present invention inserts the record selectors micro instruction between micro instruction FMUL(l) and micro instruction LD EBX,8.

During cycle 4, a first micro instruction in the corresponding sequence of micro instructions proceeds through the register/control logic 430 of the microprocessor 400. It is designated by FMUL(l). Therein, if specified by the first micro instruction, data is retrieved from registers and is provided to the first and second operand registers 434, 436.

During cycle 5, the first micro instruction in the corresponding sequence proceeds through the address/control logic 444. At this point, the first micro instruction is passed to the next stage of the pipeline. Also during cycle 5, the record selectors micro instruction proceeds through the register/control logic 430. The record selectors micro instruction is designated by XRFP CS,DS. In particular, XRFP directs the microprocessor 400 to store a code segment selector in the floating point code segment selector register 462. The code segment selector is designated by CS. Additionally, XRFP directs the microprocessor 400 to store a data segment selector (if any) in the floating point data segment selector register 463. The data segment selector is designated by DS. Hence, during cycle 5, the code segment selector is retrieved from the code segment selector register (not shown) in the register/control logic 430 and is stored in the floating point code segment selector register 462. In addition, the data segment selector (if any) is retrieved from the data segment selector register (not shown) in the register/control logic 430 and is stored in the floating point data segment selector register 463. Thus, the first part of the floating point error pointer has been saved during the time increment that would have otherwise been incurred by the translate slip.

During cycle 6, the record selectors micro instruction proceeds through the address/control logic 444. At this point, the record selectors micro instruction is passed to the next stage of the pipeline. Also during cycle 6, a second micro instruction in the corresponding sequence of micro instructions proceeds through the register/control logic 430 of the microprocessor 400. It is designated by LD EBX,8. The second micro instruction directs the microprocessor 400 to load data from a memory location using address components prescribed by the floating point macro instruction. As was described with respect to FIG. 3, a base address for the memory location is stored in register EBX and 8 is provided as a displacement. A micro opcode, LD, also implicitly prescribes a data segment, which is used along with the base address and the displacement to determine a linear address in memory containing the data. Hence, during cycle 6, in the register stage, the base address of the memory location containing floating point data is retrieved from register EBX. The base address is provided in the second operand register 436. Additionally, the displacement is provided to the displacement register 440 and a data segment base address is retrieved from the register/control logic 430 and is provided in the segment base address register 438.

During cycle 7, the second micro instruction proceeds through the address/control logic 444. Therein, a linear address for the memory location is generated by summing the data segment base address, the base address, and the displacement. The linear address is provided to the linear address register 454. Also, a data offset is generated and latched by summing the base address and the displacement. At this point, the second micro instruction is passed to the next stage in the pipeline for execution. Also during cycle 7, a third micro instruction in the corresponding sequence, FMUL(3).X, proceeds through the register stage. The translation/control logic 405 has appended the record opcode/offset extension, X, to the micro instruction FMUL(3). Additionally, as described earlier, the macro opcode associated with the floating point macro instruction is provided in the immediate field 418 of micro instruction FMUL(3). Hence, the register/control logic 430 stores the macro opcode in the floating point macro opcode register 464 and the instruction pointer, which is provided in the instruction pointer field 420, in the floating point instruction pointer register 461.

During cycle 8, the third micro instruction proceeds through the address/control logic 444. Because the record opcode/offset micro instruction extension is present, the address/control logic 444 provides the latched data offset and stores it in the floating point data offset register 465. At this point, storage of the floating point macro instruction error pointer is complete.

Because the record selectors micro instruction is inserted in place of a translate slip and the record opcode/offset micro instruction extension is executed during the same pipeline cycle as the FMUL(3) instruction, recordation of the floating point macro instruction error pointer does not require any effective pipeline cycles or associated time increments. Thus, as shown in FIG. 5, zero cycles are required to record the error pointer. In contrast to the example shown in FIG. 3, use of the present invention eliminates five cycles of the pipeline clock during execution of a floating point macro instruction that requires storage of an associated error pointer.

Figure 6:
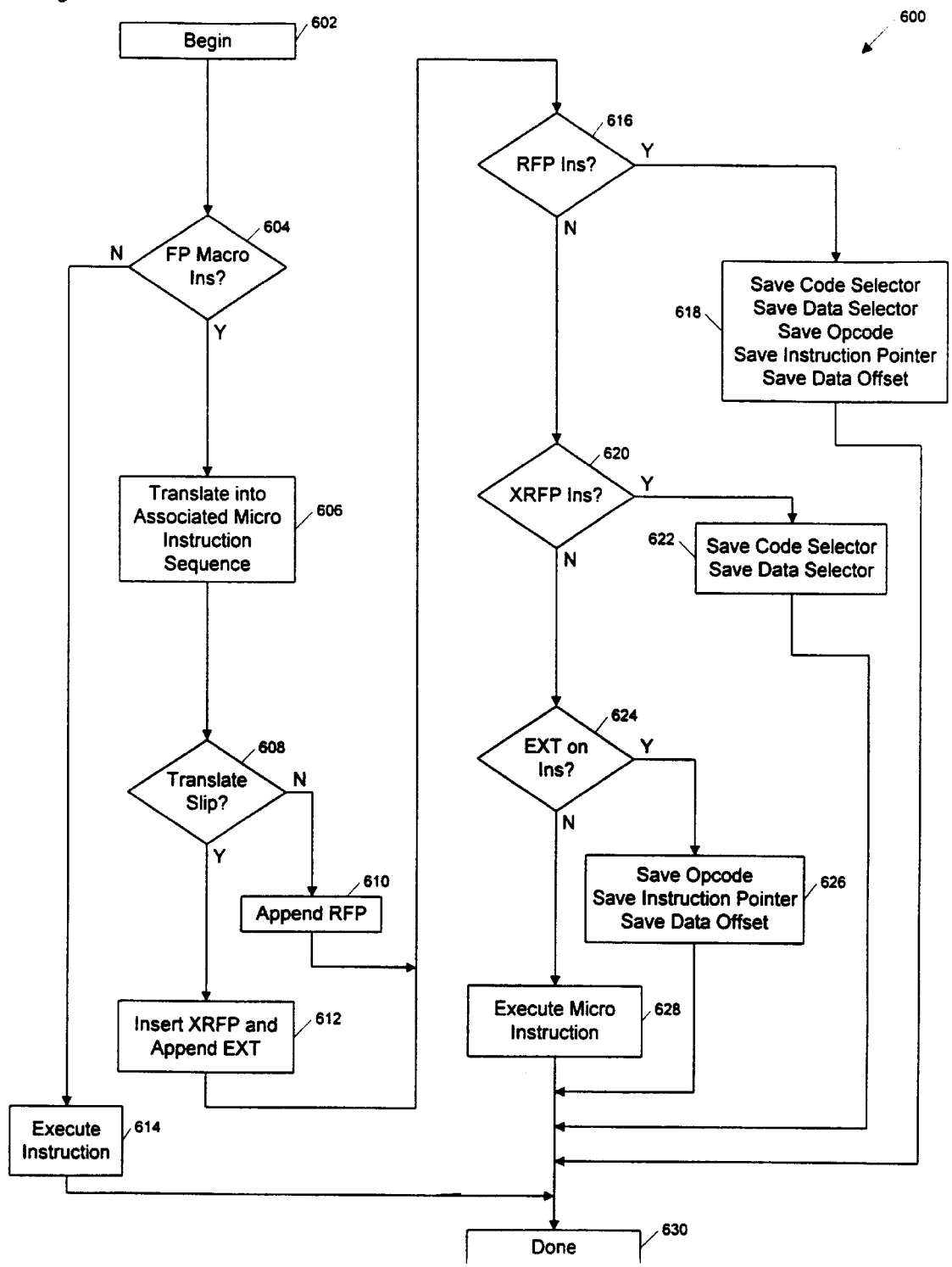
FIG. 6 is a flow chart illustrating the method according to the present invention for saving a floating point macro instruction exception pointer.

Now referring to FIG. 6, a flow chart 600 is presented that illustrates saving a floating point macro instruction exception pointer in a microprocessor according to the present invention.

The method begins at block 602 and proceeds to decision block 604.

At decision block 604, a determination is made whether a floating point macro instruction is being executed. If so, then flow proceeds to block 606. If not, then flow proceeds to block 614.

At block 614, the macro instruction is executed. Flow then proceeds to block 630, where the operation completes.

At block 606, a sequence of micro instructions is generated to execute a floating point operation associated with the floating point macro instruction. Flow then proceeds to decision block 608.

At decision block 608, a determination is made whether a the sequence of micro instructions includes a translate slip. If so, then flow proceeds to block 612. If not, then flow proceeds to block 610.

At block 610, a record floating point error pointer micro instruction is appended to the sequence of micro instructions. The record floating point error pointer micro instruction directs the microprocessor to save all elements of the floating point macro instruction error pointer. The record floating point error pointer micro instruction is described in copending U.S. patent application Ser. No. 09/033,399, referenced above. Flow then proceeds to decision block 616.

At block 612, a record selectors micro instruction is generated and inserted into the sequence of micro instructions in place of the translate slip. Also, a record opcode/offset micro instruction extension is generated and appended to a micro instruction within the sequence of micro instructions. Flow then proceeds to decision block 616.

At decision block 616, a micro instruction in the sequence of micro instructions is evaluated. If it is not a record floating point error pointer micro instruction, then flow proceeds to decision block 620. If it is a record floating point error pointer micro instruction, then flow proceeds to block 618.

At block 618, all elements of the floating point macro instruction exception pointer are saved: a code segment selector, a data segment selector (if any), an opcode, an instruction pointer, and a data offset (if any). Flow then proceeds to block 630 where the method completes.

At decision block 620, a micro instruction in the sequence of micro instructions is evaluated. If it is not a record selectors micro instruction, then flow proceeds to decision block 624. If it is a record selectors micro instruction, then flow proceeds to block 622.

At block 622, the code segment selector and the data segment selector (if any) are saved. Flow then proceeds to block 630, where the method completes.

At decision block 624, a micro instruction in the sequence of micro instructions is evaluated. If it does not include a record opcode/offset micro instruction extension, then flow proceeds to block 628. If it does include a record opcode/offset micro instruction extension, then flow proceeds to block 626.

At block 626, the opcode, instruction pointer, and data offset (if any) are saved. Flow then proceeds to block 630, where the method completes.

At block 628, the micro instruction is executed. Flow then proceeds to block 630, where the method completes.

At block 630, the method completes.

Although the present invention and its objects, features, and advantages have been described in detail, other embodiments are encompassed by the invention.

Herein, recordation of a floating point instruction error pointer has been exemplified, but it is entirely within the scope of the present invention to provide for storage of any architecturally-prescribed error pointer associated with an instruction other than a floating point instruction, where communication between elements of the microprocessor are required.

Moreover, although the description herein uses the example of a microprocessor, one skilled in the art will appreciate that the invention is also applicable to digital signal processors, numeric processors, and the like.

Finally, floating point macro instructions typically are passed from an integer unit to a floating point unit. However, future microprocessors may have a class of macro instructions that directs the microprocessor to perform a class of operations, wherein these operations are executed by functionally dedicated hardware. Communication between the microprocessor integer unit and the functionally dedicated hardware may require error pointer recording for exception handling in a manner similar to that described herein. This invention anticipates such improvements. In fact, it is within the scope of this invention to provide for recordation of the error pointer associated with the functionally dedicated hardware.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for recording a floating point macro instruction error pointer in a microprocessor, comprising:
   translation/control logic, for receiving a floating point macro instruction, and for generating a micro instruction sequence to perform a specified floating point operation, said micro instruction sequence comprising:
      a first micro instruction, for insertion into a translate slip, and for storing a first part of the floating point macro instruction error pointer; and
      a micro instruction extension, associated with a floating point micro instruction within said micro instruction sequence, and directing the microprocessor to store a second part of the floating point macro instruction error pointer;
   wherein the floating point macro instruction error pointer is recorded in zero effective time increments.

2. The apparatus as recited in claim 1, wherein said first part comprises:
   a code segment selector, for indicating a code segment base address of a first memory location for said floating point macro instruction, wherein said first memory location contains said floating point macro instruction.

3. The apparatus as recited in claim 2, wherein said first part further comprises:
   a data segment selector, for indicating a data segment base address of second memory location, wherein said second memory location contains data associated with said floating point macro instruction.

4. The apparatus as recited in claim 1, wherein said second part comprises:
   a macro opcode, for indicating an operation associated with said floating point macro instruction; and
   an instruction pointer, for indicating a first memory location for a floating point macro instruction, wherein said first memory location contains said floating point macro instruction.

5. The apparatus as recited in claim 4, wherein said second part further comprises: a data offset, for indicating a second memory location, wherein said second memory location contains data associated with said floating point macro instruction.

6. A microprocessor for saving a floating point unit environment, comprising:
   translation/control logic, for generating a micro instruction sequence directing the microprocessor to execute an operation prescribed by a floating point macro instruction, said micro instruction sequence comprising:
      a record selectors micro instruction, directing the microprocessor to save selectors associated with said floating point macro instruction; and
      a record opcode/offset micro instruction extension, directing the microprocessor to store opcode/offset data associated with said floating point macro instruction;
   register/control logic, coupled to said translation/control logic, for storing said selectors, an opcode, and an instruction pointer;
   wherein the floating point unit environment provides data required by an exception handler, when a floating point unit exception occurs, to determine that said floating point unit exception occurred as a result of executing said floating point macro instruction.

7. The microprocessor as recited in claim 6, wherein the floating point unit environment comprises said opcode and said instruction pointer.

8. The microprocessor as recited in claim 7, wherein the floating point unit environment further comprises a data pointer.

9. A method for saving a floating point macro instruction exception pointer in a microprocessor, the method comprising:
   generating a floating point micro instruction sequence to perform an operation specified by a floating point macro instruction;
   producing a first micro instruction, directing the microprocessor to save a first part of the floating point macro instruction error pointer;
   providing a micro instruction extension, associated with a floating point micro instruction within said floating point micro instruction sequence, and directing the microprocessor to save a second part of the floating point macro instruction error pointer; and
   saving the floating point macro instruction exception pointer.

10. The method as recited in claim 9, wherein said producing inserts said first micro instruction in said floating point micro instruction sequence in place of a translate slip.

11. The method as recited in claim 9, wherein said providing produces a floating point macro instruction opcode in an immediate field of a micro instruction in said floating point micro instruction sequence.

12. The method as recited in claim 9, wherein said first part comprises:

a code segment selector, for indicating a code segment base address, said code segment base address being used to calculate a first address for a first memory location containing said floating point macro instruction.

13. The method as recited in claim 12, wherein said first part further comprises:

a data segment selector, for indicating a data segment base address, said data segment base address being used to calculate a second address for a second memory location containing data prescribed by said floating point macro instruction.

14. The method as recited in claim 9, wherein said second part comprises:

a macro opcode, for indicating an operation specified by said floating point macro instruction; and an instruction pointer, said instruction pointer being used to calculate a first address for a first memory location containing said floating point macro instruction.

15. The method as recited in claim 14, wherein said second part further comprises:

a data offset, said data offset being used to calculate a second address for a second memory location containing data prescribed by said floating point macro instruction.

* * * * *